(12) United States Patent
Kim

(10) Patent No.: US 11,981,308 B2
(45) Date of Patent: May 14, 2024

(54) OPERATION CONTROL METHOD OF FOLDABLE PEDAL APPARATUS

(71) Applicants: Hyundai Motor Company, Seoul (KR); Kia Corporation, Seoul (KR)

(72) Inventor: Eun Sik Kim, Gwangmyeon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 385 days.

(21) Appl. No.: 17/471,811

(22) Filed: Sep. 10, 2021

(65) Prior Publication Data

US 2022/0324420 A1 Oct. 13, 2022

(30) Foreign Application Priority Data

Apr. 8, 2021 (KR) .................. 10-2021-0045982

(51) Int. Cl.
*B60T 7/06* (2006.01)
*B60K 26/02* (2006.01)
*B60T 7/04* (2006.01)

(52) U.S. Cl.
CPC ................ *B60T 7/06* (2013.01); *B60K 26/02* (2013.01); *B60T 7/042* (2013.01); *B60K 2026/026* (2013.01)

(58) Field of Classification Search
CPC .......... B60T 7/06; B60T 7/042; B60K 26/02; B60K 2026/026; G05G 1/44; G05G 5/005; G05G 1/30; B60W 60/0016; B60W 10/06; B60W 10/10; B60W 50/16; B60W 60/0051; B60W 60/0053; B60W 2050/0008; B60W 2540/10; B60W 2540/12; G05D 1/0061; G05D 2201/0213
See application file for complete search history.

(56) References Cited

U.S. PATENT DOCUMENTS

| | | | |
|---|---|---|---|
| 6,182,525 B1 * | 2/2001 | Bowers ................ | B60K 23/02 180/274 |
| 2004/0079613 A1 * | 4/2004 | Cho ....................... | F16H 61/22 192/220.7 |

FOREIGN PATENT DOCUMENTS

| | | | | |
|---|---|---|---|---|
| CN | 112810436 A | * | 5/2021 | ............ B60K 26/02 |
| KR | 10-2017-0137427 A | | 12/2017 | |
| KR | 10-2022-0060242 | | 5/2022 | |
| KR | 10-2022-0064791 | | 5/2022 | |

* cited by examiner

*Primary Examiner* — Marc Burgess
*Assistant Examiner* — Shien Ming Chou
(74) *Attorney, Agent, or Firm* — MORGAN, LEWIS & BOCKIUS LLP

(57) ABSTRACT

An operation control method of a foldable pedal apparatus, is capable of controlling an operation of the foldable pedal apparatus such that, when a starting-off state is changed to a starting-on state, a foldable brake pedal is popped up first, and then a foldable accelerator pedal is popped up with a time difference, and when the starting-on state is changed to the starting-off state, the foldable accelerator pedal is hidden first, and then the foldable brake pedal is hidden with a time difference.

18 Claims, 4 Drawing Sheets

WAIT FOR PREDETERMINED TIME. (ONE OR THREE MINUTES)

OPERATION CONTROL METHOD OF FOLDABLE PEDAL APPARATUS

CROSS-REFERENCE TO RELATED APPLICATION

The present application claims priority to Korean Patent Application No. 10-2021-0045982 filed on Apr. 8, 2021, the entire contents of which is incorporated herein for all purposes by this reference.

BACKGROUND OF THE INVENTION

Field of the Invention

The present invention relates to an operation control method of a foldable pedal apparatus, and more particularly, to a technology related to an operation control method of a foldable pedal apparatus, which allows a foldable brake pedal to be popped-up prior to a foldable accelerator pedal during a starting-on of a vehicle and allows the foldable accelerator pedal to be hidden prior to the foldable brake pedal during a starting-off of the vehicle.

Description of Related Art

Autonomous vehicles are smart vehicles with autonomous driving technologies for which the smart vehicles reach destinations by themselves even when drivers do not directly operate steering wheels, accelerator pedals, brakes, and the like. Recently, development of the autonomous vehicles is progressing rapidly.

When an autonomous driving situation is generally realized, it is possible to select a manual driving mode in which a driver directly drives an autonomous vehicle, and an autonomous driving mode in which the autonomous vehicle travels by itself to a destination even when the driver does not directly drive the autonomous vehicle.

Since the driver should be able to rest comfortably by extending his or her feet in the autonomous driving mode, when pedals (and accelerator pedal and a brake pedal) located in a lower space of a driver seat directly remain in a state of being exposed to an interior of the autonomous vehicle in the autonomous driving mode, the pedals interfere with the driver's rest, and in particular, when a pad of a pedal device malfunctions regardless of an intent of the driver, autonomous driving is forcibly terminated so that there is a concern of a high risk of an accident.

Therefore, in the case of autonomous vehicles, the development of a foldable pedal apparatus is actively progressing such that the pads of the pedal device are exposed to protrude toward the driver to allow the driver to manipulate the pads of the pedal device in the manual driving mode in which the driver directly drives, and in the autonomous driving mode, the pads of the pedal device are hidden to not protrude toward the driver so that the pads of the pedal device cannot be manipulated by the driver for a comfortable rest of the driver and safety including prevention of malfunction.

As described above, according to the related art, the vehicle provided with the foldable pedal apparatus has a configuration in which, during a starting-on, the foldable accelerator pedal and the foldable brake pedal are simultaneously popped upwards. When the foldable accelerator pedal and the foldable brake pedal are simultaneously popped up, a probability of a pedal mal-operation due to a driver is increased so that there is a disadvantage of degrading vehicle safety.

Furthermore, according to the related art, the foldable accelerator pedal and the foldable brake pedal are operated to be simultaneously hid during a starting-off. When the foldable accelerator pedal and the foldable brake pedal are simultaneously hid, there is a disadvantage in that the driver feels uncomfortable when an N stage gear shifting is performed for N stage parking.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an operation control method of a foldable pedal apparatus, which controls to allow a pop-up operation or a hide operation of the foldable accelerator pedal and the foldable brake pedal to be sequentially proceeded according to a starting-on situation or a starting-off situation of a vehicle and in which, when a starting-off state is changed to a starting-on state, the foldable brake pedal is popped up first and then the foldable accelerator pedal is popped up later so that it is a possible to reduce a probability of a pedal mal-operation due to a driver, improving safety of the vehicle.

Furthermore, when the starting-on state is changed to the starting-off state, the foldable accelerator pedal is hidden first and then the foldable brake pedal is hidden so that it is possible to provide convenience to an operation of an N stage gear shifting by the driver for N-stage parking and it is possible to provide convenience to the driver even when a restarting is performed within a predetermined time period after the starting-off.

According to one aspect, there is provided an operation control method of a foldable pedal apparatus, which includes a first operation of determining whether a start button is operated or whether a door open signal is generated in a state in which a starting of a vehicle is turned off; a second operation of popping a foldable brake pedal of the foldable pedal apparatus up when the controller determines that the start button is operated or that the door open signal is generated in the first operation; a third operation of determining whether a brake signal and a starting-on signal are generated within a predetermined time period after the foldable brake pedal is popped upwards; and when the controller determines that the brake signal and the starting-on signal are generated within the predetermined time period in the third operation, a fourth operation of turning a starting of the vehicle on and popping a foldable accelerator pedal of the foldable pedal apparatus upwards.

When the starting of the vehicle is in an OFF state, both the foldable accelerator pedal and the foldable brake pedal may be maintained in a hide state.

When the controller determines that the brake signal and the starting-on signal are not simultaneously generated within the predetermined time period in the third operation, a control logic may be fed back to an operation in which the starting of the vehicle is in the OFF state and both foldable accelerator pedal and the foldable brake pedal are maintained in the hide state, performing a logic again from the first operation.

The operation control method may further include, in a state in which driving of the vehicle is terminated after the fourth operation, a fifth operation of determining whether a starting-off signal is generated; when the controller determines that the starting-off signal is generated in the fifth operation, a sixth operation of turning the starting of the vehicle off and hiding the foldable accelerator pedal; a seventh operation of determining whether the brake signal and the starting-on signal are generated within a predetermined time period after the foldable accelerator pedal is hidden; when the controller determines that the brake signal and the starting-on signal are not generated within the predetermined time period through the seventh operation, an eighth operation of determining whether the brake signal and a shift lock release signal are generated within a predetermined time period; and when the controller determines that the brake signal and the shift lock release signal are not generated within the predetermined time period through the eighth operation, a ninth operation of hiding the foldable brake pedal.

After the foldable accelerator pedal is popped up through the fourth operation, the vehicle may become in a state of being ready for driving, and both the foldable accelerator pedal and the foldable brake pedal may be maintained in a pop-up state or a hide state according to a manual driving mode or an autonomous driving mode.

When the controller determines that the brake signal and the starting-on signal are generated within the predetermined time period in the seventh operation, the control logic is fed back between the third operation and the fourth operation of turning the starting of the vehicle on and popping the foldable accelerator pedal up, performing the logic again from the fourth operation.

When the controller determines that the brake signal and the shift lock release signal are generated within the predetermined time period in the eighth operation, a shifting stage of the vehicle may be changed to an N stage (neutral stage), and a control logic may perform the ninth operation.

After the ninth operation, the control logic may be fed back to an operation in which the starting of the vehicle is in the OFF state and both the foldable accelerator pedal and the foldable brake pedal are maintained in the hide state, performing the logic again from the first operation, and when it is determined that the start button is not operated, and simultaneously, it is determined that the door open signal is not generated in the first operation, the control logic may be terminated.

According to another aspect, there is provided an operation control method of a foldable pedal apparatus, which includes, when a vehicle provided with a foldable accelerator pedal and a foldable brake pedal is in a starting-off state, maintaining both the foldable accelerator pedal and the foldable brake pedal in a hide state; when the vehicle is changed from the starting-off state to a starting-on state, popping the foldable brake pedal up first and popping the foldable accelerator pedal up with a time difference after the foldable brake pedal is popped upwards; and when the vehicle is changed from the starting-on state to the starting-off state, hiding the foldable accelerator pedal first, and then hiding the foldable brake pedal with a time difference after the foldable accelerator pedal is hidden.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
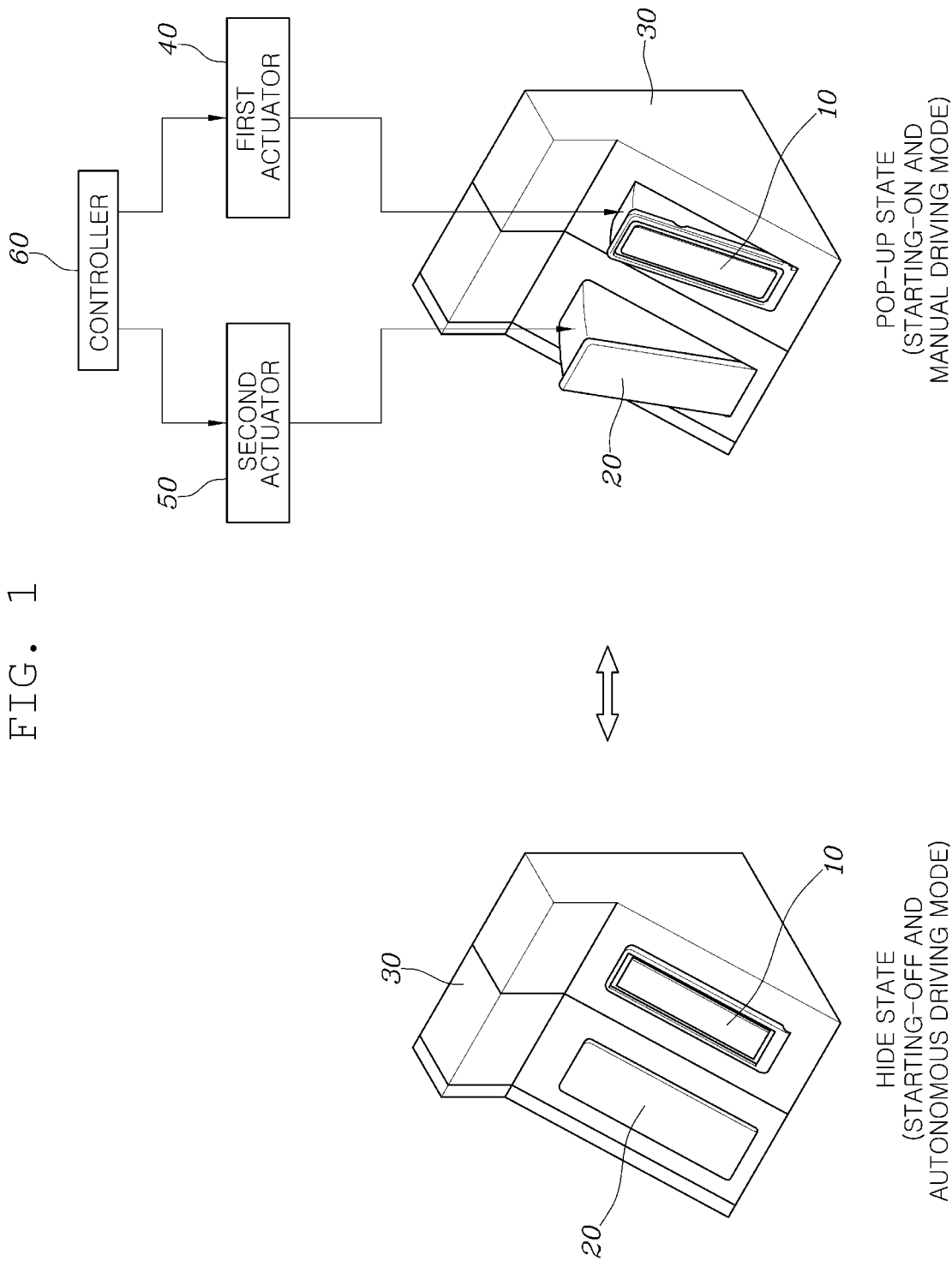
FIG. 1 is a perspective view exemplarily illustrating a foldable accelerator pedal and a foldable brake pedal according to various exemplary embodiments of the present invention.
Figure 2:
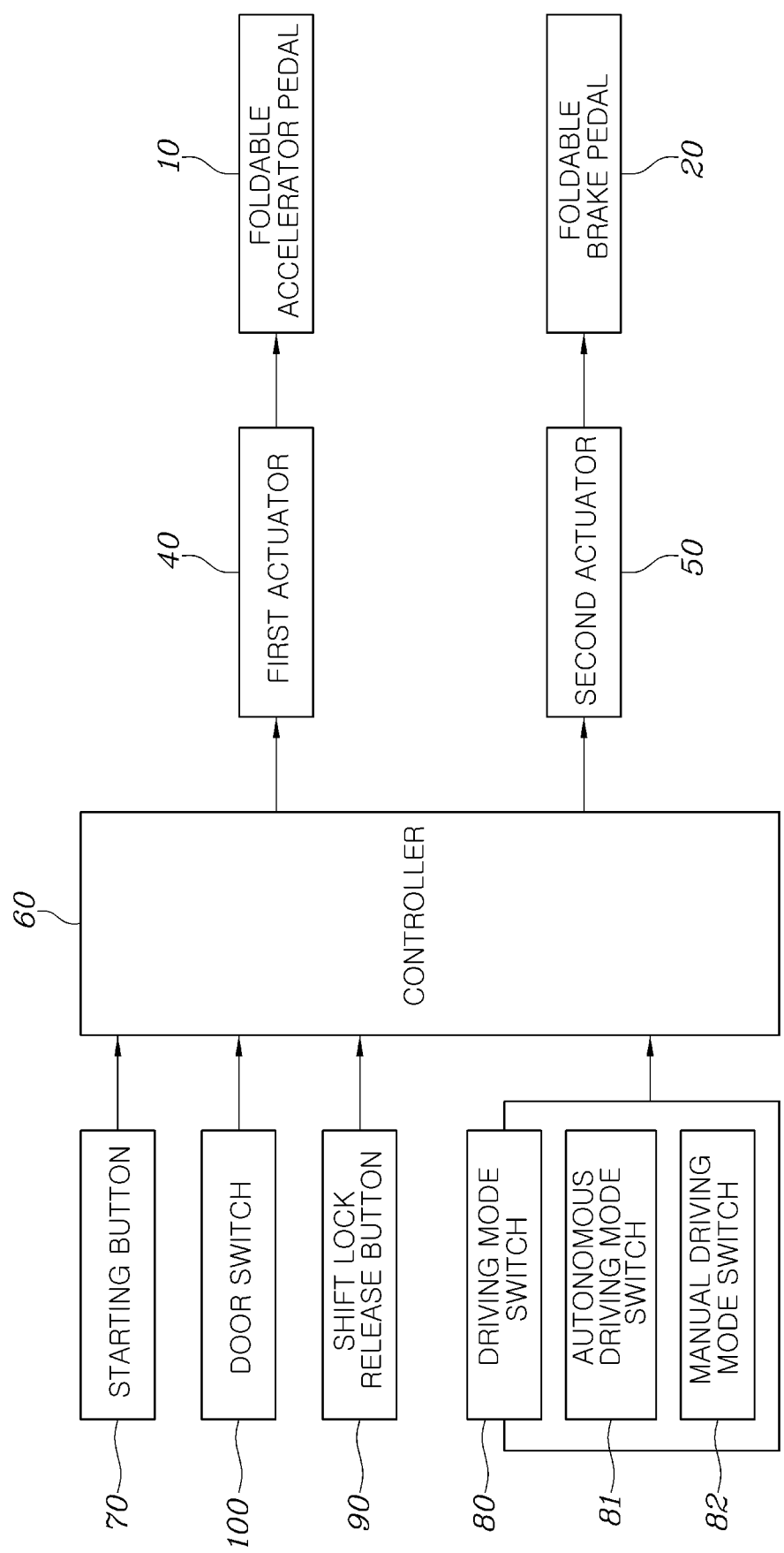
FIG. 2 and FIG. 3 are a schematic block diagram and a flowchart for describing an operation control method of a foldable pedal apparatus according to various exemplary embodiments of the present invention.
Figure 3:
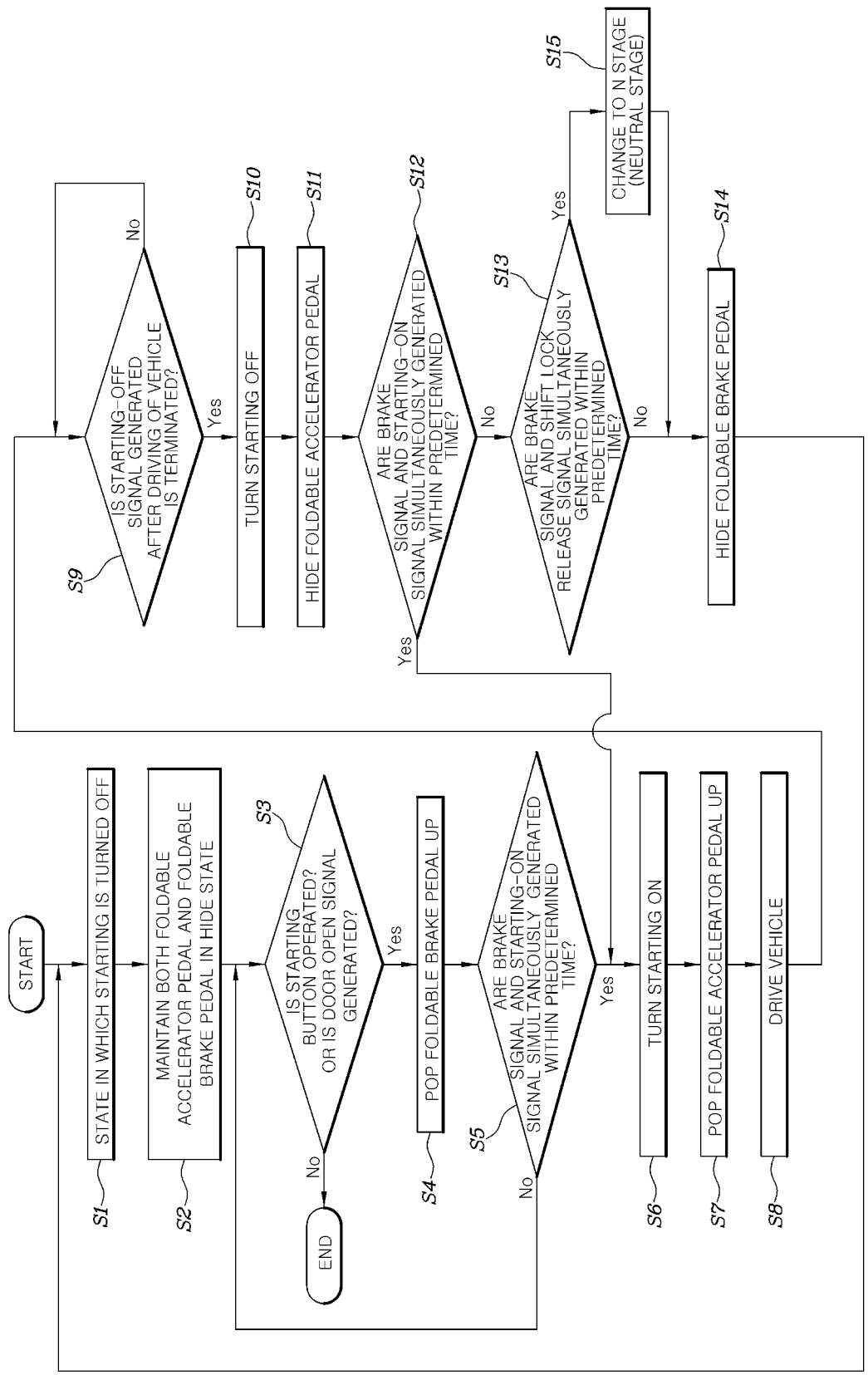

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural and functional descriptions of the exemplary embodiments of the present invention disclosed in the present disclosure or application are illustrative only for the purpose of describing the exemplary embodiments according to various exemplary embodiments of the present invention, and the exemplary embodiments according to various exemplary embodiments of the present invention may be implemented in various forms and should not be construed as being limited to exemplary embodiments described in the present disclosure or application.

The exemplary embodiments according to various exemplary embodiments of the present invention may be variously modified and may have various forms, so that specific embodiments will be illustrated in the drawings and be described in detail in the present disclosure or application. It should be understood, however, that it is not intended to limit the exemplary embodiments according to the concept of the present invention to specific disclosure forms, but it includes all modifications, equivalents, and alternatives falling within the spirit and scope of the present invention.

The terms first, second, and the like may be used to describe various components, but the components should not be limited by these terms. These terms may be used only for the purpose of distinguishing one component from another component, and for example, a first component may be referred to as a second component, and similarly, the second component may also be referred to as the first component without departing from the scope of the present invention.

When a component is referred to as being "connected," or "coupled" to another component, it may be directly connected or coupled to another component, but it should be understood that yet another component may exist between the component and another component. On the other hand, when a component is referred to as being "directly connected" or "directly coupled" to another, it should be understood that yet another component may not be present between the component and another component. Other expressions describing the relationship between components, that is, "between" and "immediately between," or "adjacent to" and "directly adjacent to" should also be construed as described above.

The terms used herein are for the purpose of describing only specific embodiments and are not intended to limit the present invention. Unless the context clearly dictates otherwise, the singular form includes the plural form. In the present disclosure, it should be construed that the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those skilled in the art to which various exemplary embodiments of the present invention pertains. General terms that are defined in a dictionary shall be construed to have meanings that are consistent in the context of the relevant art, and will not be interpreted as having an idealistic or excessively formalistic meaning unless clearly defined in the present disclosure.

A control portion (controller) according to various exemplary embodiments of the present invention may be implemented through an algorithm configured to control operations of various components of the vehicle, a non-volatile memory configured to store data relating to software commands to reproduce the algorithm, or a processor configured to perform operations, which will be described below, using data stored in a corresponding memory. Here, the memory and the processor may be implemented as separate chips. Alternatively, the memory and the processor may be implemented as a single chip in which the memory and the processor are integrated. The processor may be in a form of one or more processors.

Hereinafter, an operation control method of a foldable pedal apparatus according to exemplary embodiments of the present invention will be described with reference to the accompanying drawings.

An autonomous vehicle may select a manual driving mode in which a driver directly drives an autonomous vehicle, and an autonomous driving mode in which the autonomous vehicle travels by itself to a destination even when the driver does not directly drives the autonomous vehicle.

Furthermore, the autonomous vehicle may be provided with a foldable pedal apparatus. As shown in FIG. 1, the foldable pedal apparatus includes a foldable accelerator pedal 10 and a foldable brake pedal 20.

The foldable accelerator pedal 10 and foldable brake pedal 20 are pivotably coupled to the pedal housing 30 and operated by the driver's feet, and the pedal housing 30 is provided to be located in a space below a driver seat from in an interior of the autonomous vehicle.

In the autonomous vehicle provided with the foldable accelerator pedal 10 and the foldable brake pedal 20, in the manual driving mode, the driver directly operates the foldable accelerator pedal 10 and foldable brake pedal 20 using his or her feet. To the present end, the foldable accelerator pedal 10 and foldable brake pedal 20 should become in a pop-up state of protruding from the pedal housing 30 to be exposed to the driver.

Furthermore, in the autonomous driving mode, for the driver's comfortable rest, prevention of mal-operation, and safety, the foldable accelerator pedal 10 and the foldable brake pedal 20 should become in a hide state of being inserted into and hid in the pedal housing 30. Thus, the foldable accelerator pedal 10 and the foldable brake pedal 20 should become in a state of not protruding toward the driver.

As described above, to implement the pop-up state and the hide states of the foldable accelerator pedal 10 and the foldable brake pedal 20, the exemplary embodiment according to various exemplary embodiments of the present invention further includes a first actuator 40 and a second actuator 50 for forcibly pivoting the foldable accelerator pedal 10 and the foldable brake pedal 20, respectively, and has a configuration in which the first actuator 40 and the second actuator 50 may be formed as motors and a controller 60 controls an operation of each of the first actuator 40 and the second actuator 50.

The exemplary embodiment according to various exemplary embodiments of the present invention is characterized in that, when the autonomous vehicle provided with the foldable accelerator pedal 10 and the foldable brake pedal 20 is in the starting-off state, both the foldable accelerator pedal 10 and the foldable brake pedal 20 are maintained in the hide state, and when the autonomous vehicle is changed from the starting-off state to the starting-on state, the foldable brake pedal 20 is popped up first and then the foldable accelerator pedal 10 is popped up with a time difference after the foldable brake pedal 20 is popped up, and when the autonomous vehicle is changed from the starting-on state to the starting-off state, the foldable accelerator pedal 10 is hidden first and then the foldable brake pedal 20 is hidden with a time difference after the foldable accelerator pedal 10 is hidden.

That is, as shown in FIG. 1, FIG. 2, FIG. 3, and FIG. 4, an operation control method according to various exemplary embodiments of the present invention includes a first operation of determining whether a starting button 70 is operated or whether a door open signal is generated in a state in which the autonomous vehicle is in the starting-off state; when it is determined that the starting button 70 is operated or that the door open signal is generated in the first operation, a second operation of popping the foldable brake pedal 20 upwards; after the foldable brake pedal 20 is popped up, a third operation of determining whether a brake signal and a starting-on signal are simultaneously generated within a predetermined time period; and when the controller determines that the brake signal and the starting-on signal are generated within the predetermined time period in the third operation, a fourth operation of turning the starting of the autonomous vehicle on and popping the foldable accelerator pedal 10 upwards.

Figure 4B:
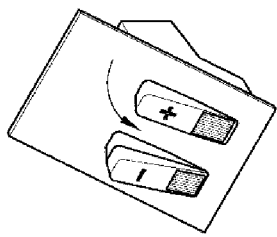
FIG. 4A, FIG. 4B, FIG. 4C, FIG. 4D, FIG. 4E, and FIG. 4F are diagrams for describing the foldable accelerator pedal and the foldable brake pedal which are operated by the operation control method according to various exemplary embodiments of the present invention.
Figure 4C:
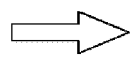
Figure 4C:
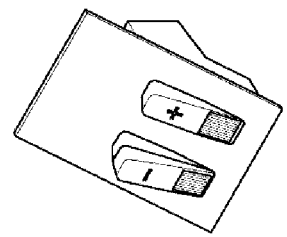
Figure 4A:
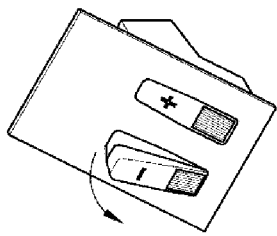
Figure 4D:
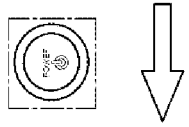
Figure 4D:
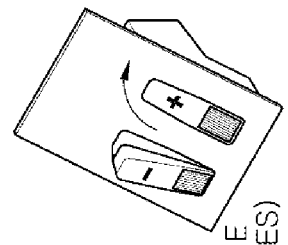

A control logic according to various exemplary embodiments of the present invention is started in a state in which the starting of the autonomous vehicle is turned off (operation S1), and when the starting of the autonomous vehicle is turned off, both the foldable accelerator pedal 10 and the foldable brake pedal 20 are maintained in a hide state due to operations of first and second actuators 40 and 50 under the control of the controller 60 (operation S2 and a state shown in FIG. 4A).

After the operation S2, when the driver operates the starting button 70 or opens a door to ride in the autonomous vehicle, the controller 60 performs the first operation of determining whether the starting button 70 is operated or whether the door open signal is generated due to an operation of a door switch 100 (operation S3), and when it is determined that the starting button 70 is operated or that the door open signal is generated in the first operation (operation S3), the controller 60 performs the second operation of popping the foldable brake pedal 20 up first due to an operation of the second actuator 50 under the control of the controller 60 (operation S4 and a state shown in FIG. 4B).

When the starting-off state is changed to the starting-on state, the reason that the foldable brake pedal 20 is popped up prior to the foldable accelerator pedal 10 is for safety. In contrast, when the foldable accelerator pedal 10 is popped up prior to the foldable brake pedal 20, there is a concern in that an accident occurs due to unintentional and sudden acceleration resulting from mal-operation of the driver. To prevent such an accident, when the starting-off state is changed to the starting-on state, the foldable brake pedal 20 should be popped up prior to the foldable accelerator pedal 10.

After the foldable brake pedal 20 is popped up through the second operation (operation S4), the controller 60 performs the third operation of determining whether a brake signal and a starting-on signal are simultaneously generated within a predetermined time period (for example, one or three minutes) from a time when the foldable brake pedal 20 is popped up (operation S5).

The brake signal is generated when the foldable brake pedal 20 is manipulated, and the start-on signal is generated when the driver manipulates the starting button 70.

When it is determined that the brake signal and the starting-on signal are simultaneously generated within the predetermined time period in the third operation (operation S5), the starting of the autonomous vehicle is turned on (operation S6), and the controller 60 performs the fourth operation of popping the foldable accelerator pedal 10 up due to an operation of the first actuator 40 under the control of the controller 60 (operation S7 and a state shown in FIG. 4C).

However, when it is determined that the brake signal and the starting-on signal do not occur together within the predetermined time period in the third operation (operation S5), the control logic according to various exemplary embodiments of the present invention returns to the operation of maintaining the state in which the starting of the foldable accelerator pedal 10 of the autonomous vehicle is in an OFF state and maintaining the foldable accelerator pedal 10 and the foldable brake pedal 20 are maintained in a hide state (returning prior to the operation S3), performing a logic from the first operation again.

When both the foldable accelerator pedal 10 and the foldable brake pedal 20 become in the pop-up state through the fourth operation (operation S7), the autonomous vehicle becomes in a state of being ready for driving, and when the autonomous vehicle is driving, both the foldable accelerator pedal 10 and the foldable brake pedal 20 are maintained in the pop-up state or in the hide state according to the manual driving mode or the autonomous driving mode (operation S8 and a state of FIG. 4C).

The autonomous vehicle is provided with a driving mode switch 80 for changing a driving mode of the autonomous vehicle to the manual driving mode or the autonomous driving mode. When the driver manipulates an autonomous driving mode switch 81, the autonomous vehicle executes the autonomous driving mode in which the autonomous vehicle drives itself. In the instant case, both the foldable accelerator pedal 10 and the foldable brake pedal 20 are maintained in the hide state due to the operations of the first and second actuators 40 and 50 under the control of the controller 60.

In contrast, when the driver manipulates a manual driving mode switch 82, the autonomous vehicle executes the manual driving mode in which the driver directly drives autonomous vehicle. In the instant case, both the foldable accelerator pedal 10 and the foldable brake pedal 20 are maintained in the pop-up state due to the operations of the first and second actuators 40 and 50 under the control of the controller 60 (a state shown in FIG. 4D).

After the fourth operation (operation S7), when the driver manipulates the starting button 70 in a state in which the driving of the vehicle is terminated, the controller 60 performs a fifth operation of determining whether the starting-off signal is generated (operation S9). When it is determined that the starting-off signal is generated in the fifth operation (operation S9), the starting of the vehicle is turned off (operation S10), and a sixth operation of hiding the foldable accelerator pedal 10 first due to the operation of the first actuator 40 under the control of the controller 60 is performed (operation S11, and a state shown in FIG. 4E).

The reason that the foldable accelerator pedal 10 is hidden prior to the foldable brake pedal 20 when the starting-on state is changed to the starting-off state is to protect a circuit from a frequent change when a restarting of the autonomous vehicle is performed within a predetermined time period after the starting-off state, and the reason is to provide convenience to the driver. Furthermore, the reason is to provide convenience to an N (neutral) stage gear shifting operation of the driver for N parking after the starting-off state.

After the foldable brake pedal 10 is hidden through the sixth operation (operation S11), the controller 60 performs a seventh operation of determining whether the brake signal and the starting-on signal are simultaneously generated within a predetermined time period (for example, one or three minutes) from a time when the foldable brake pedal 10 is popped up (operation S12).

The brake signal is generated when the foldable brake pedal 20 is manipulated, and the start-on signal is generated when the driver manipulates the starting button 70.

Figure 4F:
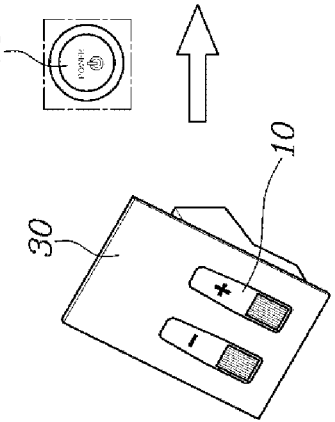
Figure 4E:
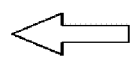
Figure 4E:
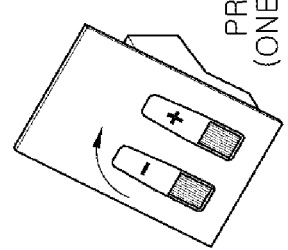

When it is determined that the brake signal and the starting-on signal are not simultaneously generated within the predetermined time period through the seventh operation (operation S12), the controller 60 performs an eighth operation of determining whether the brake signal and a shift lock release signal are simultaneously generated within a predetermined time period (for example, one or three minutes) (operation S13), and when it is determined that the brake signal and the shift lock release signal are not simultaneously generated within the predetermined time period through the eighth operation (operation S13), the controller 60 performs a ninth operation of hiding the foldable brake pedal 20 due to the operation of the second actuator 50 under the control of the controller 60 (operation S14 and a state shown in FIG. 4F).

The shift lock release signal is generated when the driver manipulates a shift lock release button 90.

Meanwhile, when it is determined that the brake signal and the starting-on signal are simultaneously generated within the predetermined time period through the seventh operation (operation S12), the controller 60 determines as an operation of the driver to restart the autonomous vehicle within a predetermined time period after the starting-off state. According to the above determination result, the control logic according to various exemplary embodiments of the present invention returns between the third operation and the fourth operation of turning the starting of the autonomous vehicle and popping the foldable accelerator pedal 10 (feedback prior to operation S6), performing a logic again from the fourth operation.

Furthermore, when it is determined that the brake signal and the shift lock release signal are simultaneously generated within the predetermined time period through the eighth operation (operation S13), a shifting stage of the autonomous vehicle is changed to the N stage (neutral stage) (operation S15), and the control logic according to various exemplary embodiments of the present invention performs the ninth operation (operation S14) through operation S15.

Furthermore, after the ninth operation (operation S14), the control logic according to various exemplary embodiments of the present invention returns to the operation in which the starting of the autonomous vehicle is in the OFF state and both the foldable accelerator pedal 10 and the foldable brake pedal 20 are maintained in the hide state (feedback prior to operation S3), performing a logic again from the first operation (operation S3) (a state shown in FIG. 4A). In the first operation (operation S3), when it is determined that the starting button 70 is not operated, and simultaneously, it is determined that the door open signal is not generated, the control logic according to various exemplary embodiments of the present invention is terminated without further proceeding.

As described above, the exemplary embodiment of the present invention relates to the operation control method of a foldable pedal apparatus, which controls to allow the pop-up operation or the hide operation of the foldable accelerator pedal 10 and the foldable brake pedal 20 to be sequentially proceeded according to the starting-on situation or the starting-off situation of the autonomous vehicle and in which, when the starting-off state is changed to the starting-on state, the foldable brake pedal 20 is popped up first and then the foldable accelerator pedal 10 is popped up with a time difference so that there is an advantage capable of reducing a probability of a pedal mal-operation due to the driver, improving safety of the autonomous vehicle.

Furthermore, when the starting-on state is changed to the starting-off state, the foldable accelerator pedal 10 is hidden first and then the foldable brake pedal 20 is hidden with a time difference so that there is an advantage capable of providing convenience to the operation of the N stage gear shifting by the driver for N-stage parking, and, there is an advantage capable of providing convenience to the driver even when a restarting is performed within a predetermined time period after the starting-off state.

In accordance with an operation control method of a foldable pedal apparatus according to various exemplary embodiments of the present invention, a pop-up operation or a hide operation of a foldable accelerator pedal and a foldable brake pedal may be sequentially proceeded according to a starting-on situation or a starting-off situation of an autonomous vehicle so that, when a starting-off state is changed to a starting-on state, the foldable brake pedal is popped up first and then the foldable accelerator pedal is popped up with a time difference, and thus there is an effect capable of reducing a probability of a pedal mal-operation due to a driver, thereby improving safety of the autonomous vehicle.

Furthermore, when the starting-on state is changed to the starting-off state, the foldable accelerator pedal is hidden first and then the foldable brake pedal is hidden with a time difference so that there is an effect capable of providing convenience to an operation of a neutral (N) stage gear shifting by the driver for N-stage parking, and there is an effect capable of providing convenience to the driver even when a restarting is performed within a predetermined time period after the starting-off state.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An operation control method of a foldable pedal apparatus, the operation control method comprising:
   a first operation of determining, by a controller, whether a start button is operated or whether a door open signal is generated in a state in which a driving power of a vehicle is turned off;
   a second operation of popping, by the controller, a foldable brake pedal of the foldable pedal apparatus up when the controller determines that the start button is operated or that the door open signal is generated in the first operation;
   a third operation of determining, by the controller, whether a brake signal and a driving power-on signal are generated within a predetermined time period after the foldable brake pedal is popped upwards; and
   when the controller determines that the brake signal and the driving power-on signal are generated within the predetermined time period in the third operation, a fourth operation of turning on, by the controller, the driving power of the vehicle and popping, by the controller, a foldable accelerator pedal of the foldable pedal apparatus upwards.

2. The operation control method of claim 1, further including:
   when the driving power of the vehicle is in a turned OFF state in the first operation, maintaining, by the controller, the foldable accelerator pedal and the foldable brake pedal in a hide state, and determining, by the controller, whether the start button is operated or whether the door open signal is generated.

3. The operation control method of claim 1, when the controller determines that the brake signal and the driving power-on signal are not generated within the predetermined time period in the third operation, the controller is configured for maintaining the driving power of the vehicle in a turned OFF state and maintaining the foldable accelerator pedal and the foldable brake pedal in a hide state in the fourth operation.

4. The operation control method of claim 1, further including:
   in a state in which driving of the vehicle is terminated after the fourth operation, a fifth operation of determining whether a driving power-off signal is generated;
   when the controller determines that the driving power-off signal is generated in the fifth operation, a sixth operation of turning off the driving power of the vehicle and hiding the foldable accelerator pedal;
   a seventh operation of determining whether the brake signal and the driving power-on signal are generated within a predetermined time period after the foldable accelerator pedal is hidden;
   when the controller determines that the brake signal and the driving power-on signal are not generated within the predetermined time period through the seventh operation, an eighth operation of determining whether the brake signal and a shift lock release signal are generated within a predetermined time period; and
   when the controller determines that the brake signal and the shift lock release signal are not generated within the predetermined time period through the eighth operation, a ninth operation of hiding the foldable brake pedal.

5. The operation control method of claim 4, wherein, after the foldable accelerator pedal is popped up through the fourth operation, the vehicle becomes in a state of being ready for driving, and the foldable accelerator pedal and the foldable brake pedal are maintained in a pop-up state or a hide state according to a manual driving mode or an autonomous driving mode.

6. The operation control method of claim 4, wherein, when the controller determines that the brake signal and the driving power-on signal are generated within the predetermined time period in the seventh operation, the controller is configured for turning on the driving power of the vehicle and popping the foldable accelerator pedal up, and for returning to the fourth operation.

7. The operation control method of claim 4, wherein, when the controller determines that the brake signal and the shift lock release signal are generated within the predetermined time period in the eighth operation, the controller is configured for changing a shifting stage of the vehicle to a neutral stage, and the controller perform the ninth operation.

8. The operation control method of claim 4, wherein, after the ninth operation, the controller is configured for maintaining the driving power of the vehicle in a turned OFF state and maintaining the foldable accelerator pedal and the foldable brake pedal in a hide state, and for returning to the first operation, and when the controller determines that the start button is not operated and the door open signal is not generated in the first operation, the controller is configured for terminating operation control of the controller.

9. A non-transitory computer readable storage medium on which a program for performing the method of claim 1 is recorded.

10. An operation control method of a foldable pedal apparatus, the operation control method comprising:
    when a vehicle provided with a foldable accelerator pedal and a foldable brake pedal of the foldable pedal apparatus is in a driving power-off state, maintaining, by a controller, the foldable accelerator pedal and the foldable brake pedal in a hide state;
    when the vehicle is changed from the driving power-off state to a driving power-on state, popping, by the controller, the foldable brake pedal up first and popping, by the controller, the foldable accelerator pedal up with a time difference after the foldable brake pedal is popped upwards; and
    when the vehicle is changed from the driving power-on state to the driving power-off state, hiding, by the controller, the foldable accelerator pedal first, and then hiding, by the controller, the foldable brake pedal with a time difference after the foldable accelerator pedal is hidden.

11. A foldable pedal apparatus comprising:
    a foldable accelerator pedal and a foldable brake pedal that are pivotably coupled to a pedal housing;

a first actuator configured for pivoting the foldable accelerator pedal and a second actuator configured for pivoting the foldable brake pedal; and a controller electrically connected to the first actuator and the second controller and configured for controlling an operation of each of the first actuator and the second actuator, wherein the controller is configured for performing:

a first operation of determining whether a start button is operated or whether a door open signal is generated in a state in which a driving power of a vehicle is turned off;

a second operation of popping the foldable brake pedal up when the controller determines that the start button is operated or that the door open signal is generated in the first operation;

a third operation of determining whether a brake signal and a driving power-on signal are generated within a predetermined time period after the foldable brake pedal is popped upwards; and when the controller determines that the brake signal and the driving power-on signal are generated within the predetermined time period in the third operation, a fourth operation of turning on the driving power of the vehicle and popping a foldable accelerator pedal of the foldable pedal apparatus upwards.

12. The foldable pedal apparatus of claim 11, wherein, when the driving power of the vehicle is in a turned OFF state in the first operation, the controller is configured for maintaining the foldable accelerator pedal and the foldable brake pedal in a hide state and determining whether the start button is operated or whether the door open signal is generated.

13. The foldable pedal apparatus of claim 11, wherein, when the controller determines that the brake signal and the driving power-on signal are not generated within the predetermined time period in the third operation, the controller is configured for maintaining the driving power of the vehicle in a turned OFF state and maintaining the foldable accelerator pedal and the foldable brake pedal in a hide state in the fourth operation.

14. The foldable pedal apparatus of claim 11, wherein the controller is configured for:

in a state in which driving of the vehicle is terminated after the fourth operation, a fifth operation of determining whether a driving power-off signal is generated;

when the controller determines that the driving power-off signal is generated in the fifth operation, a sixth operation of turning the driving power of the vehicle off and hiding the foldable accelerator pedal;

a seventh operation of determining whether the brake signal and the driving power-on signal are generated within a predetermined time period after the foldable accelerator pedal is hidden;

when the controller determines that the brake signal and the driving power-on signal are not generated within the predetermined time period through the seventh operation, an eighth operation of determining whether the brake signal and a shift lock release signal are generated within a predetermined time period; and when the controller determines that the brake signal and the shift lock release signal are not generated within the predetermined time period through the eighth operation, a ninth operation of hiding the foldable brake pedal.

15. The foldable pedal apparatus of claim 14, wherein, after the foldable accelerator pedal is popped up through the fourth operation, the vehicle becomes in a state of being ready for driving, and the controller is configured for maintaining the foldable accelerator pedal and the foldable brake pedal in a pop-up state or a hide state according to a manual driving mode or an autonomous driving mode.

16. The foldable pedal apparatus of claim 14, wherein, when the controller determines that the brake signal and the driving power-on signal are generated within the predetermined time period in the seventh operation, the controller is configured for turning on the driving power of the vehicle and popping the foldable accelerator pedal up, and for returning to the fourth operation.

17. The foldable pedal apparatus of claim 14, wherein, when the controller determines that the brake signal and the shift lock release signal are generated within the predetermined time period in the eighth operation, the controller is configured for changing a shifting stage of the vehicle to a neutral stage, and the controller is configured for performing the ninth operation.

18. The foldable pedal apparatus of claim 14, wherein, after the ninth operation, the controller is configured for maintaining the driving power of the vehicle in a turned OFF state and maintaining the foldable accelerator pedal and the foldable brake pedal in a hide state, and for returning to the first operation, and when the controller determines that the start button is not operated and the door open signal is not generated in the first operation, the controller is configured for terminating operation control of the controller.

* * * * *